US009154414B2

(12) United States Patent
Seaman-Kossmeyer et al.

(10) Patent No.: US 9,154,414 B2
(45) Date of Patent: Oct. 6, 2015

(54) REVERSE PATH FORWARDING ROUTER SYSTEM

(71) Applicant: Cisco Technology, Inc., San Jose, CA (US)

(72) Inventors: Clayton Seaman-Kossmeyer, Cincinnati, OH (US); Dario Nicolas Ciccarone, West New York, NJ (US)

(73) Assignee: Cisco Technology, Inc., San Jose, CA (US)

( * ) Notice: Subject to any disclaimer, the term of this patent is extended or adjusted under 35 U.S.C. 154(b) by 112 days.

(21) Appl. No.: 13/905,631

(22) Filed: May 30, 2013

(65) Prior Publication Data

US 2014/0355607 A1    Dec. 4, 2014

(51) Int. Cl.
*H04L 12/721*    (2013.01)
(52) U.S. Cl.
CPC ..................................... *H04L 45/72* (2013.01)
(58) Field of Classification Search
USPC .......................................................... 370/392
See application file for complete search history.

(56) References Cited

U.S. PATENT DOCUMENTS

| | | | | |
|---|---|---|---|---|
| 7,480,255 | B2 * | 1/2009 | Bettink | 370/254 |
| 8,571,047 | B2 * | 10/2013 | Zhu | 370/401 |
| 2003/0191857 | A1 * | 10/2003 | Terrell et al. | 709/244 |
| 2008/0052206 | A1 * | 2/2008 | Edwards et al. | 705/34 |
| 2013/0058343 | A1 * | 3/2013 | Casado et al. | 370/392 |
| 2013/0223452 | A1 * | 8/2013 | Shimonishi et al. | 370/392 |

OTHER PUBLICATIONS

IETF, RFC2827, May 2000.*
IETF, RFC3704, Mar. 2004.*
"Unicast Reverse Path Forwarding ACL Support", Cisco Systems, Inc., Nov. 26, 2012, pp. 1-10.
"Unicast Reverse Path Forwarding Enhancements for the Internet Service Provider—Internet Service Provider Network Edge", Cisco Systems, Inc., 2005, pp. 1-19.
"Security Configuration Guide: Unicast Reverse Path Forwarding Cisco IOS XE Release 3S (ASR 1000)", Cisco Systems, Inc., 2012, pp. 1-36.

* cited by examiner

*Primary Examiner* — Melvin Marcelo
*Assistant Examiner* — Peter Solinsky (57) ABSTRACT

An apparatus configured to route packets over networks may be configured to determine whether a packet is valid prior to routing a received packet. The apparatus may receive the packet on one of a plurality of interfaces. The apparatus may identify the interface on which the packet is received and also a source of the packet. Additionally, the apparatus may access a bundle of acceptable interfaces on which a packet from the source may be received. The number of acceptable interfaces may be greater than a single interface, but less that all of the interfaces of the apparatus configured to receive packets from over the networks. If the interface on which the packet is received is an acceptable interface identified by the bundle, then the packet is valid and routed to a next location. Otherwise, the packet is determined to be invalid and dropped.

12 Claims, 4 Drawing Sheets

Fig. 1

| Bundle – Source A |
|---|
| Ist I/F 106a |
| 2nd I/F 106b |
| 4th I/F 106d |
| |

REVERSE PATH FORWARDING ROUTER SYSTEM

FIELD

The present embodiments relate to routing systems, and particularly to routers configured to determine whether to forward a packet to a next location based on whether an interface on which the packet is received is part of a bundle of acceptable interfaces.

BACKGROUND

Unicast Reverse-Path Forwarding (uRPF) is a routing technology that attempts to block packet spoofing by matching a source Internet Protocol (IP) address of a received packet against routing entries in a forward information base (FIB) or a routing information base (RIB). While implementing uRPF in routers may be desirable in order to block packet spoofing, implementing uRPF with too strict of criteria may cause routers to drop packets that are actually valid or non-spoofed packets.

DESCRIPTION OF EXAMPLE EMBODIMENTS

Overview

An apparatus may include a routing device configured to receive and route packets over one or more networks. The routing device may include a plurality of interfaces configured to receive the packets from the networks. The routing device may also include a validity module executable by a processor. The validity module may be configured to identify an interface of the plurality of interfaces on which a packet is received. The validity module may also identify a source of the packet. In addition, the validity module may determine whether the packet is valid based on a comparison of the interface on which the packet is received with a bundle associated with the source. The bundle may identify a plurality of acceptable interfaces for receipt of the packet. Also, a number of the plurality of acceptable interfaces is less than all of the plurality of interfaces.

Example Embodiments

The present disclosure describes a routing device that is configured to determine whether to route a received packet toward a destination or drop the packet based on whether an interface (I/F) on which the packet is received is part of a bundle of acceptable interfaces associated with a source identified in the packet. If the interface is part of the bundle, then the routing device may route the packet toward the destination. If the interface is not part of the bundle, then the router may drop the packet. The bundle may include more than a single interface, but less than all of the interfaces of the router.

Figure 1:
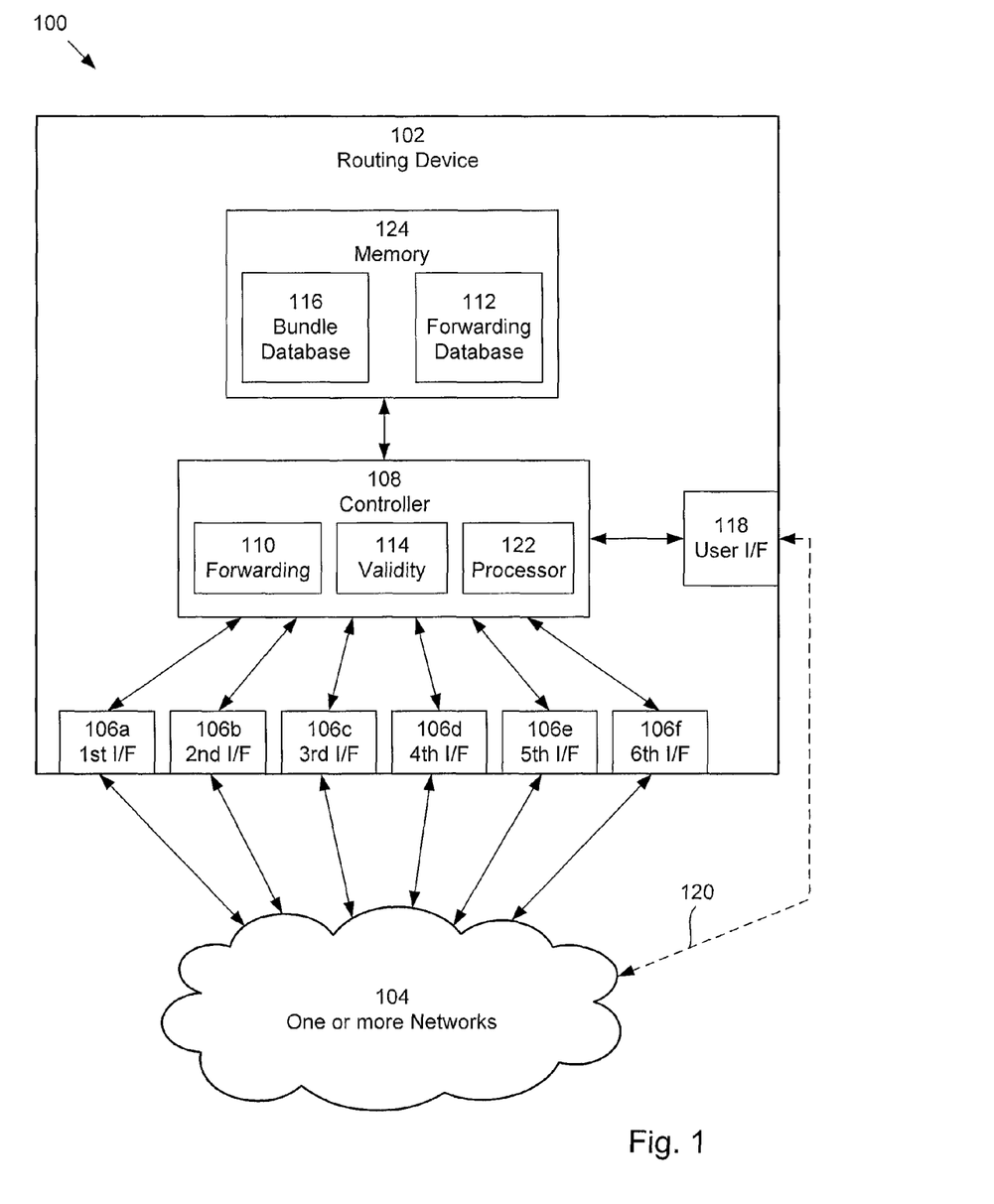
FIG. 1 illustrates an example system that includes a routing device in communication with one or more networks.

FIG. 1 shows a system 100 that includes a routing device or router 102 in communication with one or more networks 104. The routing device 102 may include any electronic network device or apparatus configured to receive a packet from over the one or more networks 104 and route or forward the packet over the one or more networks 104 toward a destination. A packet may be any routable packet carrying data or information along a path or route over the one or more networks 104. The packet may be routed using address information, such as Layer 3 or Internet Protocol (IP) addressing, Layer 2 or Media Access Control (MAC) addressing. The packet may include source information (e.g., a source address) identifying a source or a sender device of the packet. Additionally, the packet may include destination information (e.g., a destination address) identifying a destination or an intended recipient device of the packet. In some example configurations of the system 100, the one or more networks 104 may include a plurality of different networks, and the network over which the routing device 102 forwards the packet may be different than the network from which the routing device 102 received the packet. In alternative configurations, the routing device 102 may receive and send the packet over the same network.

The one or more networks 104 may include wired networks, wireless networks, or combinations thereof. In addition, the one or more networks 104 may include various types, such as public networks, private networks, local area networks (LANs), wide area networks (WANs), virtual private networks (VPNs), intranets, or the Internet, as examples. The one or more networks may be configured in accordance with one or more standards or protocols, such as Institute of Electrical and Electronics Engineers (IEEE) 802.1.1, 802.16, 802.20, 802.1Q or WiMax, as examples. Additionally, the one or more networks 104 may utilize a variety of networking protocols now available or later developed including, but not limited to TCP/IP based networking protocols.

The routing device 102 may include a plurality of interfaces 106 on which to receive and send packets over the one or more networks 104. When the routing device 102 receives a packet from over the one or more networks 104, the routing device 102 may receive the packet on one of the interfaces 106. Similarly, when the routing device 102 sends a packet over the one or more networks 104, the routing device 102 may send the packet on one of the interfaces 106. In general, each interface 106 may be any connection of the routing device 102 on which the routing device 102 may receive and/or send a packet. The interfaces 106 may be physical interfaces (e.g., Ethernet, serial, etc.), virtual interfaces (e.g., interfaces configured or identified using software), or combinations thereof.

In some example configurations, physical and virtual interfaces may be associated with each other. For example, a packet may arrive on a physical interface and also be associated with a virtual interface. Additionally, multiple virtual interfaces may be associated with a single physical interface. For example, two packets, a first packet and a second packet, may be received on the same physical interface. However, based on a type of the packet or information included in the packet, the routing device 102 may identify the first and second packets as being received on different virtual interfaces, even though they were received on the same physical interface. Various interface configurations are possible.

The routing device 102 may include any number of a plurality of interfaces 106. The routing device 102 shown in FIG. 1 includes six interfaces 106a-f, although any number of interfaces (two or more) may be included. In some example configurations, the routing device 102 may include hundreds or thousands of interfaces 106. Additionally, each interface 106 may have a uniquely identifier (ID) that uniquely identifies the interface. The interfaces 106 may be distinguished or differentiated from each other by their unique IDs.

The routing device 102 may also include a controller 108 that is configured to control operation of the routing device 102. The controller 108 may include a forwarding module 110 that is configured to manage and/or control routing of received packets. When the routing device 102 receives a packet, the forwarding module 110 may identify the interface 106 on which the packet is received. In addition, the forwarding module 110 may determine a next location (e.g., a next hop or network node) over the one or more networks 104 to which to forward the received packet. Also, the forwarding module 110 may determine which of the interfaces 106 on which to forward the packet so that the packet reaches the next location.

The forwarding module 110 may be configured to access a forwarding database 112 to determine the next location and/or the interface 106 on which to forward the packet. The forwarding database 112 may include any type of forwarding information and/or be formatted in any way suitable for the forwarding module 110 to determine the next location or interface on which to forward the packet. In addition, the forwarding database 112 may associate source information (e.g., source addresses) and/or destination information (e.g., destination addresses) with interfaces 106 of the routing device 102. When a packet is received, the forwarding module 110 may identify destination information included in the packet and access the forwarding database 112 to identify an interface 106 associated with the destination information. The forwarding module 110 may then send the packet out over the one or more networks 104 on the associated interface 106. In addition or alternatively, the forwarding database 112 may include a forwarding information base (FIB) or forwarding table, a routing information base (RIB) or routing table, and/or any other type of tables or bases that the forwarding module 110 may use and access to determine how to forward a received packet.

The controller 108 may also include a validity module 114 that is configured to determine whether a received packet is valid. The validity module 114 may be configured to determine the validity of a packet before the packet is forwarded to a next location. That is, the validity module 114 and the forwarding module 110 may communicate and/or operate in conjunction with each other such that the forwarding module 110 only forwards packets that the validity module 114 determines to be valid. If the validity module 114 determines that a received packet is invalid, then the packet may be dropped without being forwarded by the forwarding module 110.

A received packet may be valid if the packet is received on an interface that is identified by the validity module 114 as being an acceptable interface on which to receive the packet. Conversely, a received packet may be invalid if the packet is received on an interface that is identified by the validity module 114 as being an unacceptable interface on which to receive the packet.

When a packet is received on an interface, the validity module 114 may be configured to identify whether the interface is acceptable, and in turn whether the packet is valid, by accessing information included in a bundle database 116. The bundle database 116 may include information identifying bundles of acceptable interfaces. Each bundle may be associated with a source or sender of a packet that is received by the routing device 102. In addition, each bundle may include or identify a plurality of acceptable interfaces on which to receive a packet from that source. The number of acceptable interfaces identified or included in each bundle may be greater than a single interface, but less than all of the interfaces of the routing device 102. That is, the acceptable interfaces in a bundle may be a subset of all of the interfaces of the routing device 102. If a packet from a source is received on a particular interface, that interface is acceptable if the interface is part of the bundle associated with that source.

Figure 2:
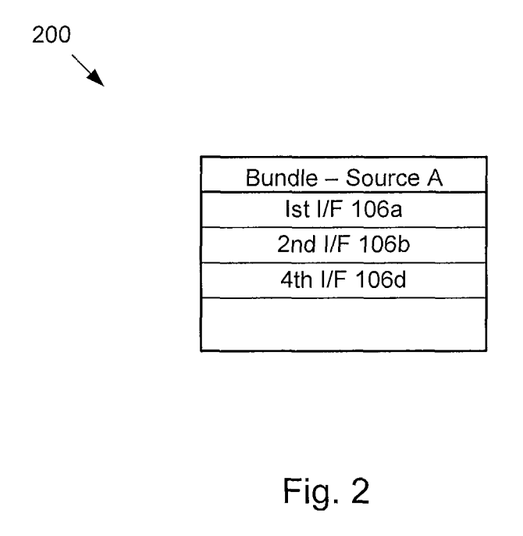
FIG. 2 illustrates a schematic diagram of an example bundle.

FIG. 2 shows a schematic of an example bundle 200 that may be stored in the bundle database 116. The bundle 200 may be for or associated with a Source A. As shown in FIG. 2, the bundle 200 may include, list or identify interfaces of the routing device 102 that are acceptable interfaces on which to receive a packet from Source A. The number of interfaces is greater than a single interface but less than all of the interfaces of the routing device 102 that are configured to receive packets from over the one or more networks 104. In this case, the bundle 200 includes the first interface 106a, the second interface 106b, and the fourth interface 106d. As explained in further detail below, at various times, the bundle 200 may be added to the bundle database 116, removed from the bundle database 116, and/or interfaces may be added to and/or removed from the bundle 200 for Source A.

When a packet is received on an interface, the validity module 114 may identify the source of the packet and the interface on which the packet is received. The validity module 114 may then access the bundle database 116 to identify a bundle of acceptable interfaces on which packets may be received for that source. The validity module 114 may further compare the interface on which the packet is received with the plurality of acceptable interfaces listed in the bundle. Based on the comparison, the validity module 114 may determine whether the received packet is valid. In particular, if the interface on which the packet was received matches one of the acceptable interfaces included in the bundle, then the interface is acceptable and the received packet is valid. Alternatively, if the interface on which the packet is received does not match any of the acceptable interfaces included in the bundle, then the interface is unacceptable, and the received packet is invalid.

To illustrate, referring to both FIGS. 1 and 2, suppose that a packet from Source A is received on the first interface 106a, as identified by the validity module 106a. The validity module 114 may then access the bundle 200 for Source A in the bundle database 116. When the validity module 114 accesses the bundle 200, the validity module 114 may identify the first interface 106a as being an acceptable bundle for Source A. Because the interface on which the packet was received (i.e., the first interface 106a) matches one of the acceptable interfaces listed in the bundle for Source A, the validity module 114 may identify the received packet as being valid. In turn, the forwarding module 110 may forward the packet on one of the interfaces 106 to a next location.

On the other hand, suppose that a packet from Source A is received on the third interface 106c, as identified by the validity module 114. In response, the validity module 114 may access the bundle 200 for Source A in the bundle database 116 and identify that third interface 106d as not being part of the bundle of acceptable interfaces for Source A. Because the packet was received on an interface that does not match one of the acceptable interfaces listed in the bundle for Source A, the validity module 114 may identify the received packet as being invalid. In turn, the forwarding module 110 may drop the packet without sending the packet on one of the interfaces to a next location.

In some example configurations, the acceptable interfaces included in the bundles may be identified using their unique IDs. The validity module 114 may use the unique identifiers of the interfaces to compare the interface on which the packet is received with the acceptable interfaces to determine the validity of the packet.

The use of bundles to identify whether a packet is valid may be similar to or considered a form of unicast reverse path forwarding (uRPF) in which a packet should not be accepted on an interface from which it should not have been received. Unicast reverse path forwarding may be used to prevent receipt of unwanted packets or undesirable events, such as spoofing, denial-of-service (DoS) attacks, or distributed denial-of-service (DDoS) attacks, as examples. However, the use of bundles may be contrasted from "all-or-nothing" approaches to uRPF, where a packet is dropped unless the source identified in the received packet is also identified in the forwarding database 112 as being associated with at least one of the interfaces 106 of the routing device 102. When a source is in the forwarding database 112 as being associated with an interface, the source may be considered to be "known" on that interface.

The "all-or-nothing" uRPF approaches may include two different types of modes—strict mode and loose mode. Under strict mode, a received packet may be identified as valid if the source of the packet and the interface on which the packet is received are associated with each other in the forwarding database 112. That is, a received packet is dropped, unless the source of the packet is known on the interface that received the packet. Under loose mode, a received packet may be identified as valid if the source of the packet is associated with any interface in the forwarding database 112. That is, a received packet is dropped, unless the source of the packet is known on any interface of the routing device.

Strict mode uRPF may be advantageous in that it may provide a relatively high-degree of protection from unwanted packets. However, in practice, actually valid packets that should not be dropped may be received on interfaces that are not identified as being associated with the sources of the packets in the forwarding database 112. As a result, routing devices using strict mode uRPF may have an increased tendency to drop packets that should not be dropped. Loose mode uRPF, on the other hand, may decrease the tendency of routing devices to drop otherwise valid packets because under loose mode, packets will be forwarded as long as they are known on any interface of the routing device. However, loose mode uRPF may offer a relatively low-degree of protection from unwanted packets, especially for configurations that include hundreds or thousands of interfaces.

The use of bundles may provide a middle ground between strict mode uRPF and loose mode uRPF in that the validity module 114 may look for associations between a source of a received packet and more than just a single interface on which the packet was received, but less than all of the interfaces included in the routing device. The validity module 114 may do so using the bundle information in the bundle database 116 instead of the forwarding information in the forwarding database 112.

Bundles may be advantageous for applications where a router may receive information from a source that may be located on any of a plurality of interfaces. One example application may include a customer of an Internet Service Provider (ISP) that receives packets from the ISP on multiple interfaces. For example, if a first interface of a routing device experiences a disruption in service, the ISP may send packets to the routing device on a second interface. A bundle associated with the ISP may identify both the first interface and the second interface so that packets sent to the second interface in the event of the service disruption are not dropped, as they may be under strict uRPF mode. At the same time, the use of bundles may offer sufficient protection so that any packet identified as being from the ISP received on any interface is not determined as being valid.

The bundle information in the bundle database 116 may be user-configurable by a user of the routing device 102. An example user may be someone who is an administrator, has administrative rights, or otherwise has authorization to configure the routing device 102. In addition, the bundle information may be received by the controller 108, and/or the validity module 114 of the controller 108, from a user interface 118 of the routing device 102, which may include any type of interface implemented in hardware or a combination of hardware and software that is configured to receive configuration information for the routing device. For example, the user interface 118 may be an interface on which a user may directly input the bundle information, such as a keypad, a touchscreen, or a microphone, as examples. Alternatively, the user interface 118 may include an interface that is configured to establish a wired or wireless connection with one or more other electronic devices, such as a computer (not shown), which may generate the bundle information based on a user input and send the bundle information to the user interface 118 of the routing device 102. In some example configurations, the one or more other electronic devices may communicate with the user interface 118 over the one or more networks 104, as shown by the dotted connection 120.

Upon receipt of the bundle information, the controller 108, such as by using the validity module 114, may store the bundle information in the bundle database 116 and/or modify the bundle information already being stored in the bundle database 116 based on the received bundle information. The bundle information stored in the bundle database may be dynamic. That is, the bundle information may be updated or modified at any number of various times using and/or through receipt of further bundle information. Bundles identified in the bundle information may be added or removed, and/or acceptable interfaces may be added to and/or removed from particular bundles.

Also, in some example configurations, the bundle information may identify one or more times at which to update or modify the bundle information stored in the bundle database 116. For example, the bundle information may identify a time period over which an interface is an acceptable interface in a bundle. After the time period expires, the interface may no longer be identified as an acceptable interface for that bundle. Alternatively, the bundle information may identify a time period over which an identified number of interfaces may be acceptable for a bundle. After the time period expires, other interfaces may be added to the bundle. Other bundle information may instruct the routing device 102 to switch between uRPF modes in which to be configured. For example, bundle information may instruct the routing device 102 to switch from being in a strict uRPF mode to being in a bundle mode, or may instruct the routing device 102 to be in a mode for a predetermined period of time, and then to switch to another mode. Various configurations or combinations of configurations are possible.

Additionally, different bundles may include the same interfaces. That is, the same interface may be identified as an acceptable interface on which to receive a packet for two different sources. For example, a bundle for a Source A and a bundle for a Source B may both identify the third interface 106c as being an acceptable interface on which to receive a packet.

The above description describes the bundles as being associated with sources, with each bundle including or identifying acceptable interfaces for the source. In alternative example bundle configurations, each bundle may instead be associated with one of the interfaces 106, and each bundle may include or identify acceptable sources from which packets may be received. For these alternative example bundle configurations, when a packet is received, the validity module 114 may identify a source of the packet and the interface on which it was received. The validity module 114 may then access the bundle database, identify the bundle for the interface that received the packet, and determine whether the bundle includes the source identified in the packet. If the bundle includes the source, then the validity module 114 may determine that the packet is valid. Alternatively, if the bundle does not include the source, then the validity module 114 may determine that the packet is invalid. Additionally, for these alternative example bundle configurations, when the controller 108 receives bundle information from the user interface identifying acceptable interfaces for a source, the controller 108 may add the information identifying the source to each bundle associated with the acceptable interface. However, configuring the bundles to be associated with the interfaces rather than with sources may require more bundles to be generated, particularly where the number of interfaces greatly outnumbers the number of sources.

The controller 108 of the routing device 102 may include a processor 122 configured to perform the above described functions of the controller 108, including the forwarding module 110 and the validity module 114. The processor 122 may include a single processor or a plurality of processors. Additionally, the processor 122 may be a general processor, a digital signal processor, an integrated circuit, an application specific integrated circuit, a field programmable gate array, a chip, a microchip, a microprocessor, an analog circuit, a digital circuit, combinations thereof, or other now known or later developed processors. The processor 122 may be a single device or a combination of devices, such as associated with a network or distributed processing. Any of various processing strategies may be used, such as multi-processing, multi-tasking, parallel processing, remote processing, or the like. The processor 122 may be responsive and/or configured to execute instructions stored as part of software, hardware, integrated circuits, firmware, micro-code, or the like.

In addition, the routing device 102 may also include a memory 124 in communication with the controller 108 and/or the processor 122. For some example configurations, as shown in FIG. 1, the forwarding database 112 and the bundle database 116 may be stored in the memory 124. Alternatively, the forwarding database 112 and/or the bundle database 116 may be stored remotely from the routing device 102, which the controller 108 may remotely access in order to determine the validity of a received packet and/or how to forward the received packet. The memory 124 may be computer readable storage media, such as non-transitory computer readable storage media. The computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media, and the like. The memory 124 may be a single device or a combination of devices. The memory 124 may be adjacent to, part of, networked with and/or removed from the processor 122. Logic encoded in one or more tangible media for execution is defined as the instructions that are executable by the programmed processor and that are provided on the computer-readable storage media, memories, or a combination thereof.

The memory 124 may be a computer readable storage media having stored therein data representing instructions executable by the programmed processor 124. The memory 124 may store instructions for the processor 124. The processor 122 may be programmed with and execute the instructions. The functions, acts, methods, or tasks illustrated in the figures or described herein are performed by the programmed processor 122 executing the instructions stored in the memory 124. The functions, acts, methods or tasks are independent of the particular type of instructions set, storage media, processor or processing strategy and may be performed by software, hardware, integrated circuits, firmware, micro-code, and the like, operating alone or in combination. The instructions are for implementing the processes, techniques, methods, or acts described herein.

In addition, the term "module," such as it used for the forwarding module 110 and the validity module 114, may be defined to include a plurality of executable modules. As described herein, the modules are defined to include software, hardware or some combination thereof executable by a processor, such as the processor 122. Software modules may include instructions stored in memory, such as the memory 124, or another memory device, that are executable by the processor 122 or other processor. Hardware modules may include various devices, components, circuits, gates, circuit boards, and the like that are executable, directed, and/or controlled for performance by the processor 122.

Figure 3:
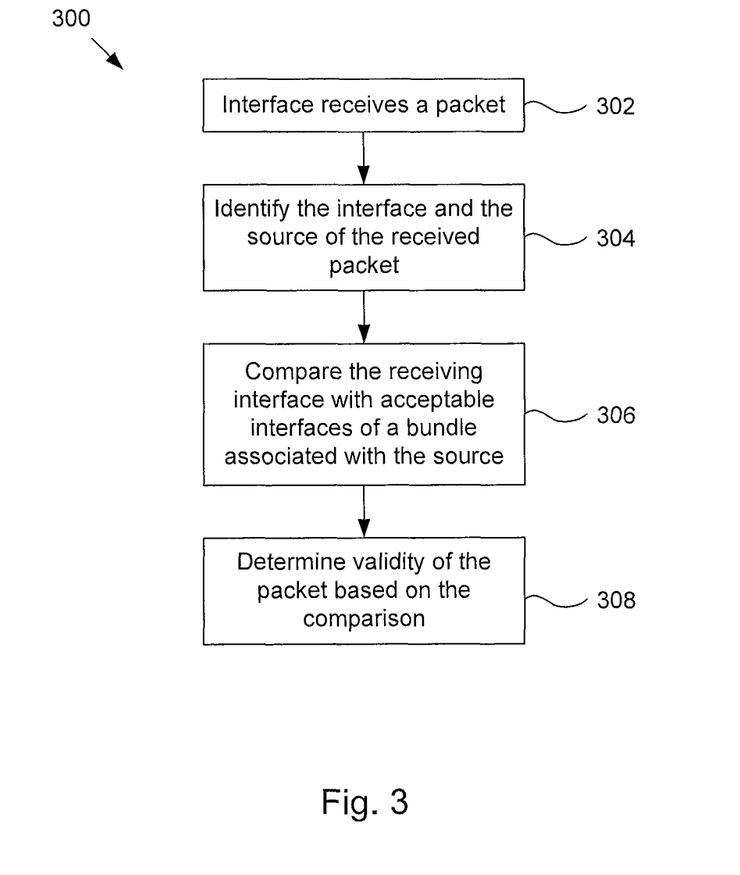
FIG. 3 illustrates a flow chart of an example method of determining whether a packet received on an interface of a routing device is valid.

FIG. 3 shows a flow diagram of an example method 300 of determining whether a received packet by a routing device is a valid packet to forward to a next location. At block 302, an interface of a plurality of interfaces of the routing device may receive a packet from over a network. At block 304, a validity module of a controller of the routing device may identify the interface that received the packet and a source of the packet. At block 306, the validity module may compare the interface on which the packet is received with a bundle associated with the source. The bundle may include a plurality of acceptable interfaces for receipt of the packet. Additionally, a number of the plurality of acceptable interfaces is less than all of the plurality of interfaces that receive packets from over one or more networks. At block 308, the validity module may determine whether the packet is a valid packet to be routed based on the comparison at block 306.

Figure 4:
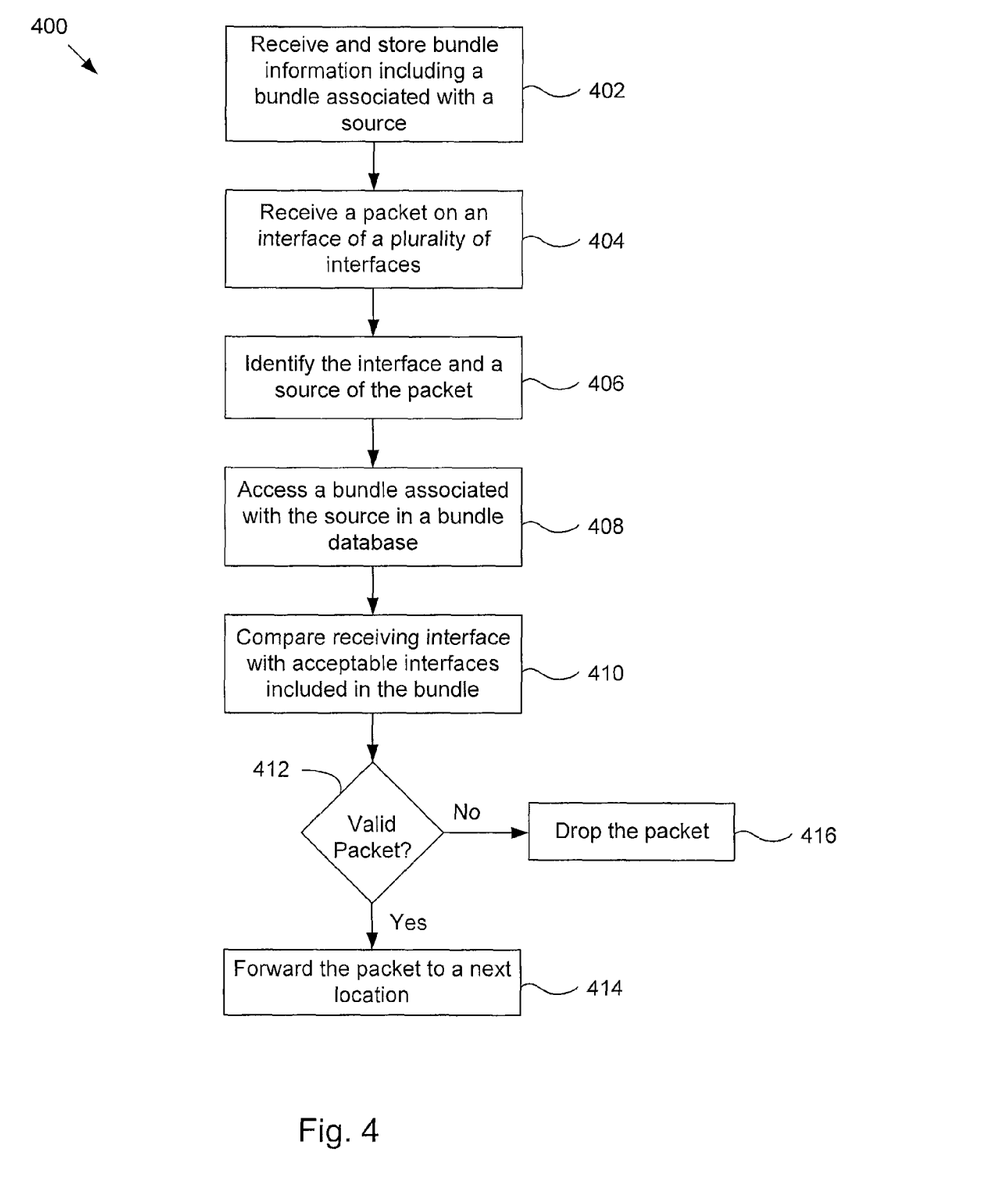
FIG. 4 illustrates a flow chart of another example method of determining whether a packet received on an interface of a routing device is valid.

FIG. 4 shows a flow diagram of another example method 400 of determining whether a received packet by a routing device is a valid packet to forward to a next location. At block 402, a controller of a routing device may receive bundle information through an interface and store the bundle information in a bundle database. The routing information may be user-configurable information that is generated based on a user input. At block 404, an interface of the routing device may receive a packet. The interface may be one of a plurality of interfaces that are configured to receive packets from over one or more networks. At block 406, a validity module may identify the interface on which the packet was received and a source of the packet. At block 408, the validity module may access a bundle database that stores bundle information to identify a bundle of acceptable interfaces that may receive a packet from the source. The number of acceptable interfaces may be greater than a single interface, but less than a total number of interfaces of the routing device configured to receive packets from over one or more networks.

At block 410, the validity module may compare the interface that received the packet with the acceptable interfaces included in the bundle. The comparison may be performed using interface IDs that uniquely identify the interfaces. For example, the validity module may compare the unique ID of the interface that received the packet with the unique IDs of each of the acceptable interfaces of the bundle. At block 412, the validity module may determine whether the packet is valid. The packet may be valid if the interface receiving the packet matches ones of the acceptable interfaces. Alternatively, the packet may be invalid if the interface receiving the packet does not match any of the acceptable interfaces. If the packet is valid, then the method 400 may proceed to block 414, where a forwarding module of the routing device may determine to forward the packet to a next location over one of one or more networks. Alternatively, if the packet is invalid, then the method 400 may proceed to block 416, where the forwarding module may drop the packet without forwarding on the packet to a next location.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. An apparatus comprising:
   a routing device comprising:
      a plurality of interfaces configured to receive packets from a plurality of sources;
      a memory comprising:
         a forwarding database that stores forwarding information comprising at least one of a forward information base (FIB) or a routing information base (RIB), the forwarding information associating with a source a set of one or more acceptable interfaces for receipt of packets from the source; and
         a bundle database that stores bundle information associating with the source a bundle comprising a plurality of acceptable interfaces for receipt of packets from the source, wherein the bundle of acceptable interfaces is different from the set of one or more acceptable interfaces indicated in the forwarding information and is less than all of the plurality of interfaces of the routing device;
      a validity module executable by a processor, the validity module configured to:
         identify an interface of the plurality of interfaces on which a packet is received from the source;
         determine whether the packet is valid based on a comparison of the interface on which the packet is received with the bundle of acceptable interfaces associated with the source, wherein the validity module is configured to access the bundle information stored in the bundle database without access of the forwarding information stored in the forwarding database to determine whether the packet is valid; and
      a forwarding module executable by the processor, wherein the forwarding module is configured to:
         forward the packet on one of the plurality of interfaces over one of the one or more networks in response to determination by the validity module that the packet is valid; and
         drop the packet without forwarding the packet in response to determination by the validity module that the packet is invalid.

2. The apparatus of claim 1, wherein the validity module is configured to:
   determine that the packet is valid in response to the interface matching one of the plurality of acceptable interfaces identified in the bundle; and
   determine that the packet is invalid in response to the interface not matching any of the plurality of acceptable interfaces identified in the bundle.

3. The apparatus of claim 1, wherein the routing device further comprises:
   a user interface configured to receive further bundle information, and
   wherein the validity module is further configured to update the bundle information stored in the bundle database with the further bundle information.

4. The apparatus of claim 3, wherein the further bundle information identifies a time at which to update the bundle information stored in the bundle database.

5. A method comprising:
   receiving, on an interface of a plurality of interfaces of a routing device, a routable packet from over a network;
   identifying, with a processor of the routing device, the interface and a source of the packet;
   storing, in a forwarding database of a memory, forwarding information comprising at least one of a forward information base (FIB) or a routing information base (RIB), the forwarding information associating with the source a set of one or more acceptable interfaces for receipt of packets from the source;
   storing, in a bundle database of the memory, bundle information associating with the source a bundle comprising a plurality of acceptable interfaces for receipt of packets from the source, wherein the bundle of acceptable interfaces is different from the set of one or more acceptable interfaces indicated in the forwarding information and is less than all of the plurality of interfaces of the routing device;
   determining, with the processor, whether the packet is valid based on a comparison of the interface on which the packet is received with the bundle of acceptable interfaces associated with the source, wherein the determination is performed by accessing the bundle information stored in the bundle database without accessing the forwarding information stored in the forwarding database;
   forwarding, with the processor, the packet on one of the plurality of interfaces over one or more networks in response to the packet being valid; and
   dropping, with the processor, the packet in response to the packet being invalid.

6. The method of claim 5, wherein determining whether the packet is valid comprises:
   determining, with the processor, that the packet is valid in response to the interface on which the packet is received matching one of the plurality of acceptable interfaces in the bundle; and
   determining, with the processor, that the packet is invalid in response to the interface on which the packet is received not matching any of the plurality of acceptable interfaces in the bundle.

7. The method of claim 5, further comprising:
   receiving, with a user interface of the routing device, further bundle information, and
   modifying, with the processor, the bundle information stored in the bundle database with the further bundle information.

8. The method of claim 7, wherein the further bundle information identifies a time at which to update the bundle information stored in the memory.

9. One or more non-transitory computer readable storage media encoded with software comprising computer executable instructions, the computer executable instructions comprising:

instructions executable to identify an interface of a plurality of interfaces of a routing device on which a packet is received from over a network;

instructions executable to identify a source of the packet;

instructions executable to store, in a forwarding database of a memory, forwarding information comprising at least one of a forward information base (FIB) or a routing information base (RIB), the forwarding information associating with the source a set of one or more acceptable interfaces for receipt of packets from the source;

instructions executable to store, in a bundle database of the memory, bundle information associating with the source a bundle comprising a plurality of acceptable interfaces for receipt of packets from the source, wherein the bundle of acceptable interfaces is different from the set of one or more acceptable interfaces indicated in the forwarding information and is less than all of the plurality of interfaces of the routing device;

instructions executable to determine whether the packet is valid based on a comparison of the interface on which the packet is received with the bundle of acceptable interfaces associated with the source, wherein the determination is performed by accessing the bundle information stored in the bundle database without accessing the forwarding information stored in the forwarding database;

instructions executable to forward the packet on one of the plurality of interfaces over one or more networks in response to the packet being valid; and instructions executable to drop the packet without forwarding the packet in response to the packet being invalid.

10. The one or more non-transitory computer readable storage media of claim 9, wherein the instructions executable to determine whether the packet is valid comprises:

instructions executable to determine that the packet is valid in response to the interface matching one of the plurality of acceptable interfaces identified in the bundle; and instructions executable to determine that the packet is invalid in response to the interface not matching any of the plurality of acceptable interfaces identified in the bundle.

11. The one or more non-transitory computer readable storage media of claim 9, wherein the computer executable instructions further comprises:

instructions executable to receive further bundle information, the further bundle information generated based on a user input, and instructions executable to update the bundle information stored in the bundle database with the further bundle information.

12. The one or more non-transitory computer readable storage media of claim 11, wherein the computer executable instructions further comprise:

instructions executable to update the bundle information stored in the memory at a time identified by the further bundle information.

* * * * *